United States Patent
Hsieh

(10) Patent No.: US 8,885,159 B1
(45) Date of Patent: Nov. 11, 2014

(54) OPTICAL SPECTRUM ANALYZER ACTUATED BY VOICE COIL

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 314 days.

(21) Appl. No.: 13/470,259

(22) Filed: May 12, 2012

Related U.S. Application Data

(60) Provisional application No. 61/486,209, filed on May 13, 2011.

(51) Int. Cl.
*G01J 3/00* (2006.01)

(52) U.S. Cl.
USPC ........................................................ 356/300

(58) Field of Classification Search
USPC .......................................... 356/300–328, 334
See application file for complete search history.

(56) References Cited

U.S. PATENT DOCUMENTS

| 5,233,405 | A * | 8/1993 | Wildnauer et al. ............ 356/333 |
| 6,512,582 | B1 | 1/2003 | Mori et al. |
| 6,665,069 | B1 | 12/2003 | Permogorov et al. |
| 7,002,680 | B2 | 2/2006 | Kaneko |
| 7,253,897 | B2 * | 8/2007 | Moon et al. ................... 356/328 |

\* cited by examiner

*Primary Examiner* — Abdullahi Nur
(74) *Attorney, Agent, or Firm* — Antonio R. Durando

(57) ABSTRACT

An optical spectrum analyzer includes a multilayer-coating filter for separating a wavelength in the spectrum of an incident input beam, a detector optically coupled to the filter, a voice-coil actuator for rotating the filter in oscillating motion to vary the wavelength received by the detector as a function of time, and an encoder for synchronizing the angular position of the filter with the wavelength received at the detector. The use of the voice-coil actuator makes it possible to achieve significantly greater speeds of operation with a significantly smaller device.

15 Claims, 4 Drawing Sheets

OPTICAL SPECTRUM ANALYZER ACTUATED BY VOICE COIL

RELATED APPLICATIONS

This application is based on and claims the priority of U.S. Provisional Application Ser. No. 61/486,209, filed May 13, 2011.

BACKGROUND OF THE INVENTION

1. Field of the Invention

This invention pertains to the general field of optical spectrum analyzers, especially as used in communication networks. In particular, the invention relates to an optical spectrum analyzer with a novel implementation of the continuously oscillating scanning mechanism.

2. Description of the Prior Art

Optical spectrum analyzers (often referred to in the art as OSAs) are usually implemented using multilayer-coating filters and diffraction gratings. As illustrated schematically in FIG. 1, in conventional diffraction grating applications a portion of the input beam I is combined with a diffraction grating 10 to separate different wavelengths and direct them in respective separate directions. A mirror 12 is used to reflect a portion of the diffracted spectrum back toward a light detector 14 through collection optics 16,18 suitable for the particular application. (A beam splitter 16 is illustrated, but it is understood that more efficient optics would generally be used in practice.)

When the angular position a of the mirror 12 with respect to the grating 10 is changed (or vice versa), as illustrated by arrow A, the wavelength reflected by the mirror varies. Therefore, the entire spectrum produced by the grating 10 may be collected by the detector 14 by varying the angle of incidence on the mirror 12 through a scan sufficiently wide to cover the spectrum. Typically, this scanning operation is carried out by mounting the mirror on a plate 20 that is alternately rotated by a suitable mechanism 22 in opposite directions over a predetermined angular range $-\eta_{max}$ to $+\theta_{max}$ (that is, the mirror is oscillated back and forth). Alternatively, the grating is oscillated in similar manner instead of the mirror.

This conventional approach suffers from several undesirable drawbacks. Because the plate supporting the mirror 12 necessarily changes direction between scan oscillations, the requirements for its mechanical implementation are rigorous, expensive, and often unreliable. The alternating motion of the mirror also limits the speed at which it can be oscillated. Furthermore, a wavelength reference device 24 has to be built into the optical spectrum analyzer in order to synchronize the timing of wavelength reflection by the mirror with the detector reading. That is, each acquisition frame of the detector 14 must be related to a wavelength, which in turn corresponds to an angular position of the mirror 12 in relation to the grating 10. The need for this additional hardware is undesirable because of its expense and potential operating complications.

Similar problems belie optical spectrum analyzers implemented with Michelson interferometers and tunable Fabry-Perot optical filters because they also require rapid oscillating motion. Therefore, the approach of the prior art to optical spectrum analyzer implementation is not particularly efficient for telecommunication applications where speed and miniaturization are essential. Less expensive and more precise technology would be very desirable in the art.

U.S. Pat. No. 7,961,316 provides a novel approach to optical spectrum analyzers based on the idea of varying the angle between the device producing the spectrum and the detector or reflecting mirror through continuous rotation, rather than through oscillating motion. This approach enables the optical spectrum analyzer to function without oscillation of any component and with greater speeds of data acquisition.

In practice, a filter is mounted on a brushless DC (BLDC) motor with an encoder attached to the axis of rotation to provide the angular position of the filter. To reduce the wear of the motor bearing, it is preferred to use the motor in a continuous motion. However, the useful angular range of the filter is only about 20 degrees. Thus, during the 360 degree rotation of the motor, the filter is outside the useful angular range most of the time. As a result, most of the time is wasted for the purposes of the device, and the refresh rate is slow. In addition, the motor and related devices are larger and bulkier than desirable for telecommunication applications. The present invention is directed at providing a simple solution to both problems.

SUMMARY OF THE INVENTION

This invention is based on the idea of using a voice coil actuator in an optical spectrum analyzer in order to achieve significantly greater speeds of operation with a significantly smaller device. The analyzer comprises an optical device for producing a wavelength separation in the spectrum of an incident input beam, such as a multilayer-coating filter; a detector optically coupled to the filter; a voice-coil actuator for rotating the filter in oscillating motion to vary the wavelength received by the detector as a function of time; and an encoder for synchronizing the angular position of the filter with the wavelength received at the detector.

Other embodiments of the invention may be implemented with a diffraction grating instead of a multilayer-coating filter. It is noted that an implementation based on an oscillating mirror reflecting toward a stationary filter and a detector is not practical because with a moving mirror it is extremely difficult to maintain the reflected beam in a predetermined direction. In contrast, using a moving filter (in transmission) the transmitted (dispersed) beam can easily be kept in the desired direction. Similarly, when a beam goes thru a plane parallel plate, it is not affected by the alignment of the plate.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 1:
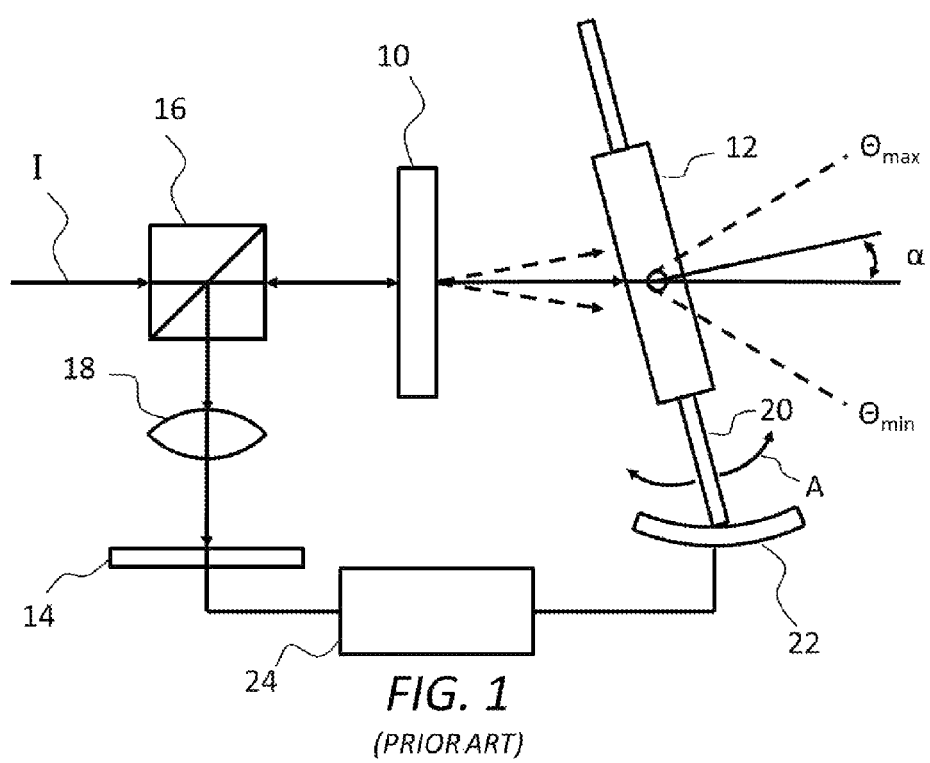
FIG. 1 illustrates the typical prior-art configuration of a diffraction-grating optical spectrum analyzer.

The idea of this invention is to replace the BLDC motor with a computer-drive voice-coil actuator. The term voice coil is commonly used to refer to the coil of wire that moves the read-write heads in a moving-head disk drive. Accordingly, the terms "voice coil" and "voice coil actuator" (VCA) are herein also so defined for the purposes of the invention.

Such a voice coil actuator is a very simple positioning device, in essence a motor, that utilizes a coil of wire in a permanent magnetic field. As illustrated in the exploded view of FIG. 2 and in FIG. 3, it consists of two separate parts: a stationary magnetic component 30 and a movable coil component 32. The magnetic component consists of two opposite poles, each made of a nickel-plated iron plate 34 with a strong rare-earth permanent magnet 36 attached to it, with a gap between them, so as to create a magnetic field with substantially vertical lines of flux between the magnets. The coil component consists of a very lightweight coil of wires 40 in a housing 42 that is pivotally mounted between the magnets 36, as shown in FIG. 3. An electric control signal drives the coil in one direction or the other, depending on the polarity of the signal, and the resulting force quickly and accurately positions the structure attached to the coil to the desired location (in the case of a hard-disk drive head, for example, to the required position of the disk head across the platter of the disk). The voice-coil motor does not need commutation, but it requires a position sensor.

Figure 2:
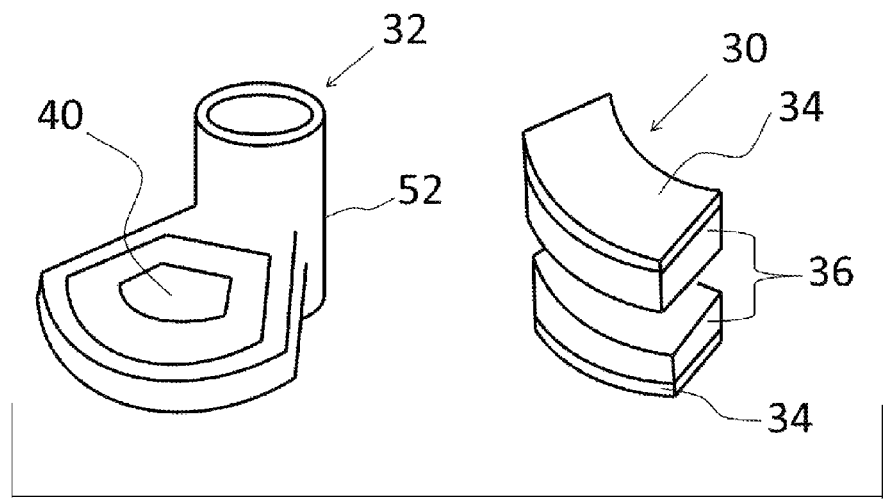
FIG. 2 is a perspective view of the magnet and coil components of a typical head-drive voice-coil actuator.
Figure 3:
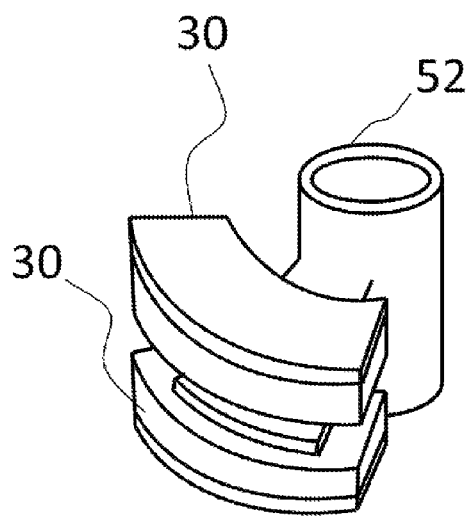
FIG. 3 is the voice-coil of FIG. 2 with a pie-shape or trapezoidal coil component rotatably assembled into the magnet components, as used in computer head drives.

The preferred embodiment of a VCA for the invention includes a bearing assembly connected to a pie-shaped, trapezoidal coil, as described in FIGS. 2 and 3. In essence, the coil is a wedge of a pancake BLDC motor (that is, a motor with a shallow depth along its axis). A pancake motor is rotationally symmetrical about the axis. If a complete 360-degree motion is not needed, as in the case of the invention, such a motor can be reduced to an asymmetric pie wedge, as illustrated in the figures. In such an arrangement, the trapezoidal coil moves only the desired amount of degrees back and forth. Such a compact construction increases reliability and produces very high speeds and accelerations. Because of the rapid back and forth motion afforded by a voice-coil structure, the filter in the optical spectrum analyzer can be rotated back and forth within a maximum range of about 45 degrees that includes the typical useful range of 20 degrees. Using such a short rotation range, the period of motion can be reduced significantly, from about 1 sec to 100 ms. If data are taken both during forward and backward motions, the refresh rate can be further reduced to 50 ms.

Figure 4:
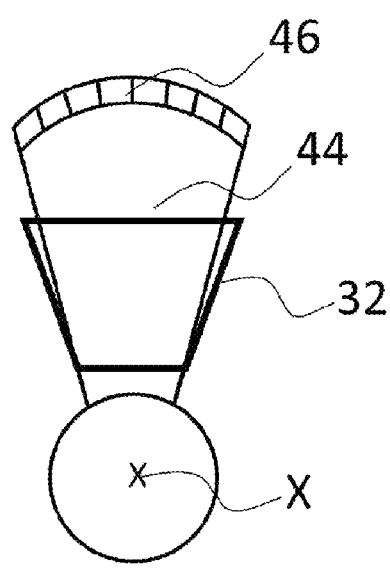
FIGS. 4, 5 and 6 are three schematic plan views of various encoder/voice-coil configurations.
Figure 5:
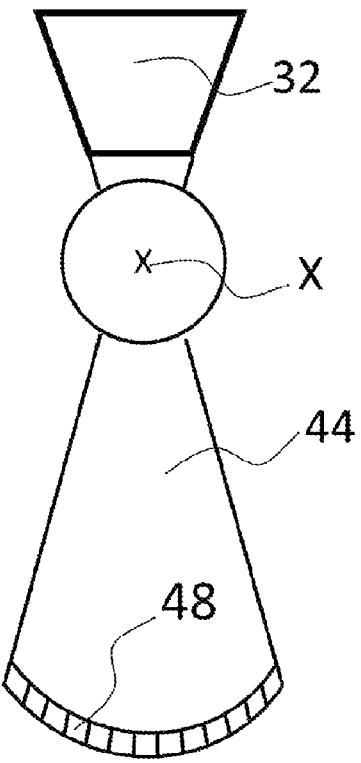
Figure 6:
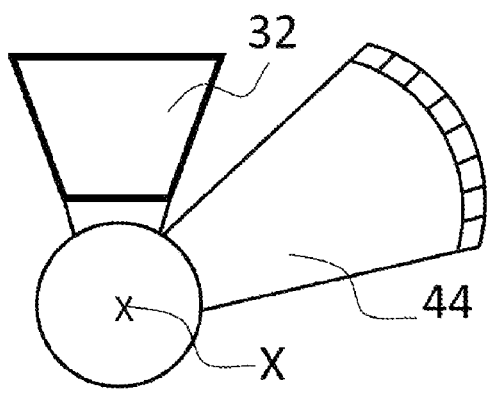

For the purposed of this invention, a position sensor 44 (encoder) can be attached directly to the wedge of the voice-coil 32 with the same rotation axis X to provide the angular position of the filter, as shown schematically in FIG. 4. Alternatively, the encoder may be attached to the bearing assembly in various configurations (as in FIGS. 5 and 6, for example). Using a larger-radius encoder with a greater number of encoder lines 48, as illustrated in FIG. 5, the angular resolution can obviously be increased. By adopting the back-and-forth motion of a VCA instead of the 360-degree rotational motion of a motor, the footprint of the device can be decreased accordingly, advantageously resulting in a very small footprint and high angular accuracy.

Figure 7:
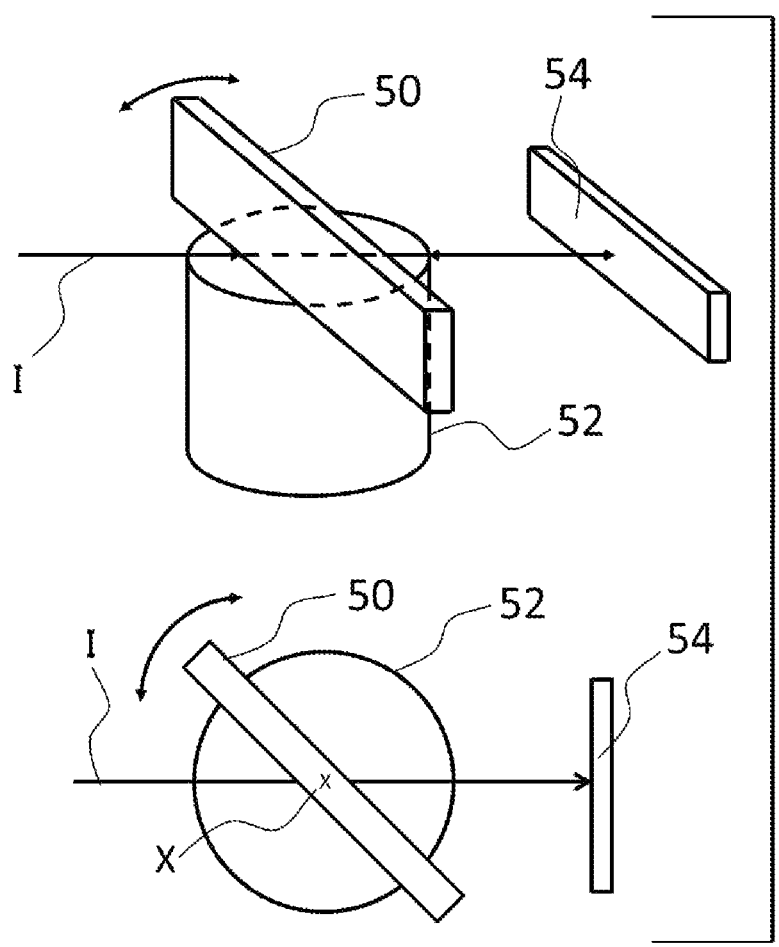
FIG. 7 is a schematic arrangement of a voice-coil-actuated optical spectrum analyzer according to the invention.

As shown schematically in FIG. 7, both in perspective and plan views, the optical filter of the invention is preferably a multilayer-coating filter 50 coupled to the bearing 52 of the coil components 32 (see FIG. 2) with the front surface perpendicular to the bearing surface such as to receive the input beam I at different angles during its back-and-forth oscillations. The beam is transmitted through the filter at a predetermined angle for every wavelength, and is reflected by the mirror 54 back thru the filter, thus continuously updating the wavelength of the light detected for analysis by a sensor. All other optical and electronic parts are arranged in the same plane with a small footprint, such that a very compact, fast, and accurate device is obtained. In what turns out to be one of the most advantageous aspects of the invention, the resolution of this OSA can be increased greatly simply by extending the length of the encoder arm. Because of the limited angular rotation of the coil component, this can be achieved while maintaining a small footprint, an ever more important feature for communications OSA applications.

While the invention has been described in what is believed to be the most practical and preferred embodiments, it is recognized that appropriate deviations can be made within the scope of the disclosure. For example, a grating may be used instead of the multilayer-coating filter 50 with essentially the same advantages. Therefore, the invention is not to be limited to the disclosed details, but is intended to embrace all equivalent structures and methods.

The invention claimed is:

1. An optical spectrum analyzer comprising:
    an optical device for producing a wavelength separation in a spectrum of an incident input beam;
    a detector optically coupled to said optical device;
    a wedge of a pancake motor for rotating said optical device in back-and-forth oscillating motion, thereby varying a wavelength received by the detector as a function of time; and
    an encoder for synchronizing an angular position of said optical device with said wavelength.

2. The optical spectrum analyzer of claim 1, wherein said optical device is a multilayer-coating filter.

3. The optical spectrum analyzer of claim 1, wherein said optical device is a tunable filter.

4. The optical spectrum analyzer of claim 1, wherein said optical device is a diffraction grating.

5. The optical spectrum analyzer of claim 1, wherein said optical device is a prism.

6. The optical spectrum analyzer of claim 1, wherein said wedge of a pancake motor is a voice-coil actuator.

7. The optical spectrum analyzer of claim 1, wherein said oscillating motion spans no more than 45 degrees.

8. The optical spectrum analyzer of claim 1, wherein said encoder extends radially from an axis of rotation of the optical device.

9. An optical spectrum analyzer comprising:
    a multilayer-coating filter for producing a wavelength separation in a spectrum of an incident input beam;
    a detector optically coupled to the filter;
    a voice-coil actuator for rotating the filter in back-and-forth oscillating motion spanning no more than 45 degrees, thereby varying a wavelength received by the detector as a function of time, said voice-coil actuator being configured as a wedge of a pancake motor; and
    an encoder extending radially from an axis of rotation of the optical device for synchronizing an angular position of the filter with said wavelength.

10. A method of analyzing a light beam comprising the following steps:
    directing the light beam toward an optical device adapted to produce a wavelength separation in a spectrum of the light beam;
    directing an output of said optical device toward a detector;
    varying a wavelength received by the detector as a function of time by rotating said optical device in a back-and-forth oscillating motion spanning no more than 45 degrees; and
    synchronizing an angular position of said optical device with said wavelength received by the detector;

wherein said varying step is carried out by rotating the optical device with a voice coil configured as a wedge of a pancake motor coupled to the optical device.

11. The method of claim 10, wherein said optical device is a multilayer-coating filter.

12. The method of claim 10, wherein said optical device is a tunable filter.

13. The method of claim 10, wherein said optical device is a diffraction grating.

14. The method of claim 10, wherein said optical device is a prism.

15. The method of claim 10, wherein said synchronizing step is carried out with an encoder that extends radially from an axis of rotation of the optical device.

\* \* \* \* \*